No. 890,915. PATENTED JUNE 16, 1908.
F. L. LUCKE.
BELT SHIFTER.
APPLICATION FILED DEC. 28, 1907.

2 SHEETS—SHEET 1.

Witnesses
Harry Opsahl.
L. L. Simpson

Inventor.
Frank L. Lucke
By his Attorneys.
Williamson Merchant

No. 890,915. PATENTED JUNE 16, 1908.
F. L. LUCKE.
BELT SHIFTER.
APPLICATION FILED DEC. 28, 1907.
2 SHEETS—SHEET 2.
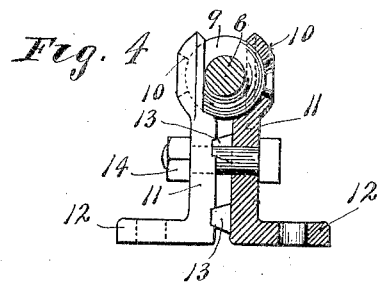
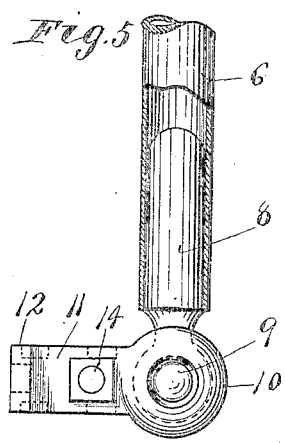
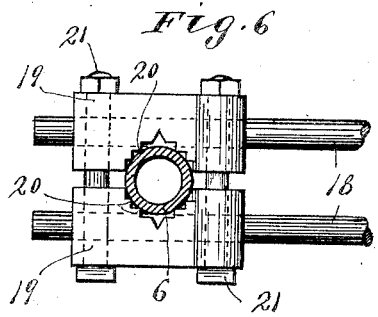
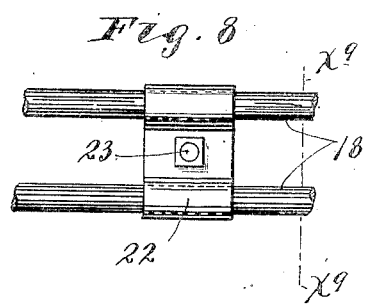
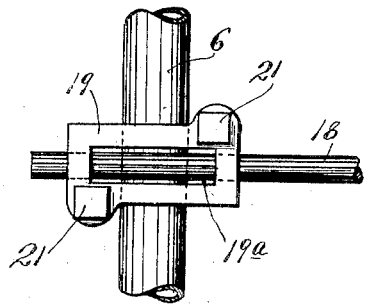
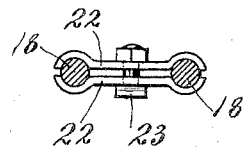
Witnesses.
Harry Opsahl.
H. S. Kilgore.
Inventor.
Frank L. Lucke.
By his Attorneys
Williamson Merchant

UNITED STATES PATENT OFFICE.

FRANK L. LUCKE, OF MINNEAPOLIS, MINNESOTA.

BELT-SHIFTER.

No. 890,915.

Specification of Letters Patent.

Patented June 16, 1908.

Application filed December 28, 1907. Serial No. 408,425.

*To all whom it may concern:*

Be it known that I, FRANK L. LUCKE, a citizen of the United States, residing at Minneapolis, in the county of Hennepin and State of Minnesota, have invented certain new and useful Improvements in Belt-Shifters; and I do hereby declare the following to be a full, clear, and exact description of the invention, such as will enable others skilled in the art to which it appertains to make and use the same.

My invention has for its object to provide a simple and efficient shifter, especially adapted for use in connection with lathes to quickly shift the driving belt on the reversely arranged stepped cone pulleys of the lathe and the overhead driving shaft.

To the above ends the invention consists of the novel devices and combinations of devices hereinafter described and defined in the claims.

Figure 1:
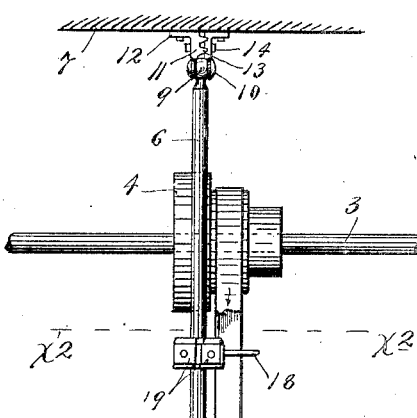
Figure 2:
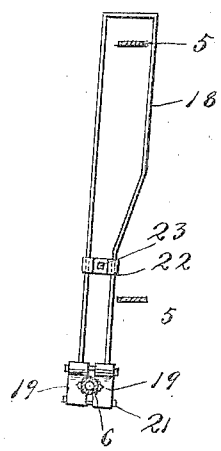
Figure 3:
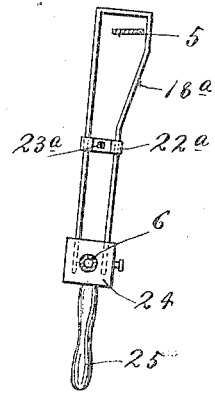
Figure 3:
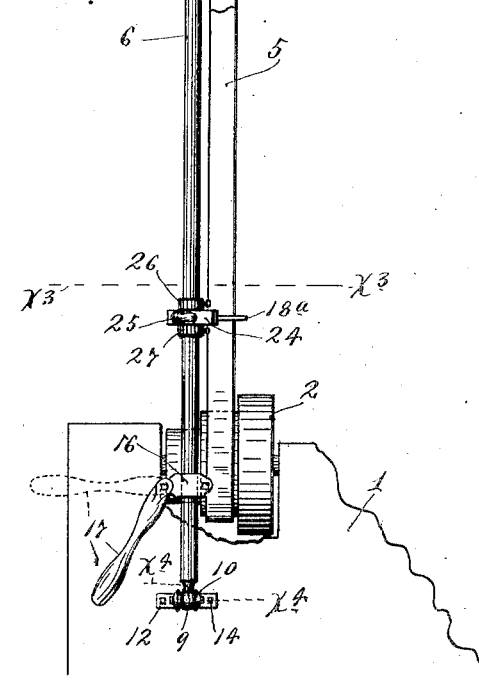

In the accompanying drawings which illustrate the invention, like characters indicate like parts throughout the several views.
Referring to the drawings, Figure 1 is a view in elevation, with some parts broken away, showing my improved belt shifter applied for action on the driving belt of a lathe. Fig. 2 is a horizontal section taken on the line $x^2 x^2$ of Fig. 1. Fig. 3 is a horizontal section taken on the line $x^3 x^3$ of Fig. 1. Fig. 4 is a horizontal section taken on the irregular line $x^4 x^4$ of Fig. 1. Fig. 5 is a view chiefly in side elevation, but partly in section, of the parts shown in Fig. 4. Fig. 6 is a detail in horizontal section, taken on the same line as Fig. 2, but with some parts broken away and with the parts shown on a larger scale than in Figs. 1 and 2. Fig. 7 is a side elevation of the parts shown in Fig. 6. Fig. 8 is a detail in plan, showing a clamp applied to the intermediate portion of a belt shifting loop; and Fig. 9 is a section on the line $x^9 x^9$ of Fig. 8.

The numeral 1 indicates the frame and the numeral 2 the stepped cone pulley of a lathe of standard construction.

The numeral 3 indicates a power driven over-head shaft which carries a stepped cone pulley 4 for coöperation with the lathe pulley 2.

The numeral 5 indicates a belt which runs over the reversely arranged stepped cone pulleys 2 and 4.

In my improved belt shifter I employ an upright rock shaft or rod 6 that is preferably hollow and may be conveniently formed from a piece of iron pipe, the length of which will depend upon the distance of a suitable overhead support 7 from the lathe.

In different applications of the improved belt shifter, the rock shaft 6 thereof will require to be set at various different angles with respect to a true vertical position, and the bearings for the upper and lower ends thereof will frequently have to be secured to various different kinds of supports and, hence, will have to occupy various different positions with respect to the said rock shaft. Hence, I provide ball and socket bearings for the ends of this rock shaft, and these are preferably constructed as best shown in Figs. 4 and 5. Short stub shafts 8 are driven into the ends of the tubular shaft 6 and rigidly secured therein. These stub shafts 8 are provided at their outer ends with bearing balls or approximately spherical bearing heads 9 that engage sockets or concave seats 10 of separable bearing brackets 11. These bearing brackets 11 are provided with perforated foot flanges 12 that adapt them to be bolted or otherwise rigidly secured to a suitable support.

One member of each pair of brackets 11 is shown as provided with spacing lugs 13 that engage the coöperating bracket. A short nutted bolt 14 passed through the intermediate portions of the coöperating brackets 11 securely clamps the two members together. The bearing brackets 11 which support the upper end of the rock shaft 6 are shown as secured to the ceiling or overhead support 7, while the bearing brackets 11 which support the lower end of said shaft are shown as secured to the lathe frame 1.

Rigidly clamped to the lower portion of the rock shaft 6 and rigidly secured thereto, but capable of pivotal and vertical adjustments thereon, is a clamping head 16 to which an operating lever 17 is pivotally attached.

The device for engagement with the upper portion of the belt 5 to shift the same on the upper stepped cone pulley 4 is preferably formed by a metal rod bent into the form of a loop and indicated at 18. The extended portion of this belt shifting loop 18 embraces the upwardly moving side of the belt 5 at a distance only slightly below the pulley 4. The prongs of the loop 18 work telescopically through coöperating clamping blocks 19. The intermediate portions of the adjacent faces of these clamping blocks 19 are cut away and provided with teeth 20 adapted to tightly engage the exterior of the rock shaft 6, as best shown in Fig. 6. The said clamping blocks 19 are cut away at 19ᵃ so that the prongs of the loop 18 project laterally into the seats formed by the toothed edges 20, and are thereby adapted to be pressed into frictional engagement with the exterior of the rock shaft 6, when said clamping blocks 19 are tightly drawn onto the said rock shaft. These clamping bolts are adapted to be clamped onto the said shaft 6 by a pair of nutted bolts 21 passed through suitable perforations in the end portions of the said blocks, the one above and the other below the prongs of the loop 18, as best shown in Figs. 6 and 7. It will thus be seen that the loop 18 is adapted to be rigidly secured to the rock shaft 6 but is capable of vertical pivotal and endwise adjustments with respect to the said shaft, so that it is adapted to be properly set with respect to the belt 5 upon which it acts.

Preferably, the intermediate portions of the prongs of the shifting loop 18 are tied together by a pair of clamping clips 22 which are clamped thereto by a short nutted bolt 23.

With the device applied as above described and as shown in the drawings, the belt may be thrown off from one of the faces of the stepped pulley 4 by an oscillatory movement of the shaft 6 and shifting loop 18 imparted thereto by manipulation of the lever 17. The said lever 17 normally hangs down out of the way, approximately as shown by full lines in Fig. 1, but when it is to be used it should be lifted approximately into the position shown by dotted lines in Fig. 1.

As is evident, a movement of the shifting loop 18 toward the right with respect to Fig. 2 is required to move the running belt off from a larger and onto a smaller face or section of the stepped pulley 4, while a movement in a reverse direction is required to move the belt from a smaller to a larger section of said pulley. By this device, it is evident that the belt may be shifted from one section to the other of the pulley 4, while the pulley and belt are running. Of course, when the belt is to be moved from a smaller to a larger section of the pulley 4, the lower portion of the belt must first be moved into alinement or contact with the coöperating smaller section of the lathe pulley 2.

In some instances it is desirable to use a shifting loop similar to that above described for shifting the lower portion of the belt from one section to another of the lathe pulley 2, and when this is found desirable I mount this lower belt shifting loop for independent pivotal movements on the lower portion of the so-called rock shaft 6. As shown in the drawings, this lower shifting loop 18ᵃ is very similar in construction to the loop 18, and the intermediate portions of its prongs are shown as connected by the clamping clips 22ᵃ and bolt 23ᵃ. The ends of the prongs of said loop 18ᵃ are adjustably mounted in suitable seats formed in a block or head 24 which has a hand-piece 25. This block 24 is pivotally mounted on the rock shaft 6 between upper and lower collars 26 and 27 that are adjustably secured on said shaft. This shifting loop 18ᵃ engages the lower portion of the downwardly moving side of the belt 5, while the upper shifting loop 18 engages the upper portion of the upwardly moving side of said belt.

The use of the belt shifting device above described eliminates danger, saves time and makes possible the use of a belt that runs tighter than can be otherwise used. Furthermore, the said device is of comparatively small cost and is capable of being easily applied to any lathe or, for that matter, to any other machine where motion is transmitted by means of stepped cone pulleys and a belt.

The so-called shifting loop may take a good many different forms, but must have a part through, or parts between which, the belt runs, so that the belt may be shifted by means of the said loop, so-called.

What I claim is:

1. A belt shifting device comprising a rock shaft, a hand-piece or lever for oscillating the same, a pair of clamping blocks bolted to said shaft and having seats engaging said shaft, and a belt shifting loop, the prongs of which are secured to said clamping blocks but are capable of endwise adjustments with respect thereto, substantially as described.

2. A belt shifting device, comprising a rock shaft, a hand-piece or lever for oscillating the same, a pair of clamping blocks having toothed seats engaging said shaft, a belt shifting loop, the prongs of which are telescoped into seats in said clamping blocks and have exposed portions adjacent to said shaft capable of being clamped against the same, and nutted bolts passed through said clamping blocks and clamping the same and the prongs of said shifting loop on said shaft, whereby the said parts are rigidly but adjustably secured together, substantially as described.

3. A belt shifting device comprising a rock shaft, a hand-piece or lever by means of which it may be oscillated, an upper belt shifting loop rigidly secured to said rock shaft, and a lower belt shifting loop pivotally mounted on said shaft, substantially as described.

4. The combination with reversely arranged upper and lower stepped pulleys, and a belt running thereon, of a belt shifting device comprising a rock shaft a hand-piece or lever for oscillating the same, an upper belt shifting loop secured to said shaft and engageable with the upper portion of the upwardly moving side of said belt, and a lower belt shifting loop pivotally mounted on said shaft and engageable with the lower portion of the downwardly moving side of said belt, substantially as described.

In testimony whereof I affix my signature in presence of two witnesses.

FRANK L. LUCKE.

Witnesses:
H. D. KILGORE,
MALIE HOEL.